United States Patent [19]

Green et al.

[11] 3,975,598

[45] Aug. 17, 1976

[54] RANDOM-ACCESS SPOKEN WORD ELECTRON BEAM DIGITALLY ADDRESSABLE MEMORY

[75] Inventors: David Green, Corning, N.Y.; Harvey C. Nathanson; Paul R. Malmberg, both of Pittsburgh, Pa.

[73] Assignee: Westinghouse Electric Corporation, Pittsburgh, Pa.

[22] Filed: May 17, 1973

[21] Appl. No.: 361,107

[52] U.S. Cl. .................. 179/100.1 B; 179/100.1 PS; 179/100.3 A

[51] Int. Cl.[2] .............................................. G11B 7/02

[58] Field of Search .............. 179/100.3 A, 100.3 B, 179/100.3 D, 100.3 S, 100.3 M, 100.1 B, 100.1 PS; 340/173 CR; 178/6.7 A

[56] References Cited

UNITED STATES PATENTS

| | | | |
|---|---|---|---|
| 2,148,166 | 2/1939 | Kucher | 179/100.3 A |
| 2,347,084 | 4/1944 | Cooney | 179/100.3 A |
| 2,485,829 | 10/1949 | Holst et al. | 179/100.3 A |
| 2,575,445 | 11/1951 | Germer | 179/100.3 A |
| 3,206,557 | 9/1965 | Greenly | 179/100.3 A |
| 3,252,006 | 5/1966 | Post | 179/100.1 B |
| 3,445,715 | 5/1969 | Dombeck | 340/173 CR |
| 3,536,854 | 10/1970 | Boldery | 179/100.3 A |
| 3,588,584 | 6/1971 | Tubinis | 340/173 CR |
| 3,721,962 | 3/1973 | Foster et al. | 340/173 CR |
| 3,769,468 | 10/1973 | Shutterly | 179/100.3 B |
| 3,774,168 | 11/1973 | Koo et al. | 340/173 CR |

*Primary Examiner*—Stuart N. Hecker
*Attorney, Agent, or Firm*—M. P. Lynch

[57] ABSTRACT

A method and apparatus for digitally addressing an electron beam to select and then scan one of a plurality of spaced apart analog recordings of spoken words on a target. An electron gun at one end of a return beam vidicon tube provides the electron beam to scan the target positioned at the other end of the tube. The target is a wafer of semiconductive material with an oxide layer facing the electron gun. Variable width openings are etched into the oxide layer such that the edges of the openings define analog recordings. A first electron beam deflection control rapidly directs the beam in the "Y" direction along the ends of the tracks to provide a track count for producing a track access signal by a digitally addressed downcounter. A second electron beam deflection control produces a scanning of the selected track in the "X" direction while the electron beam oscillates at a dither frequency in the "Y" direction to scan the width of the track. Control of the electron beam in the "Z" direction provides a beam blanking during standby mode and provides intensity modulation to improve track acquisition performance and allow variable volume emphasis during the scan mode. The scanning rate in the "X" direction is controlled to produce different word inflections or enunciation rates. A scan signal threshold detector senses the end of a word to enable compiling of a sentence with variable length words.

22 Claims, 23 Drawing Figures

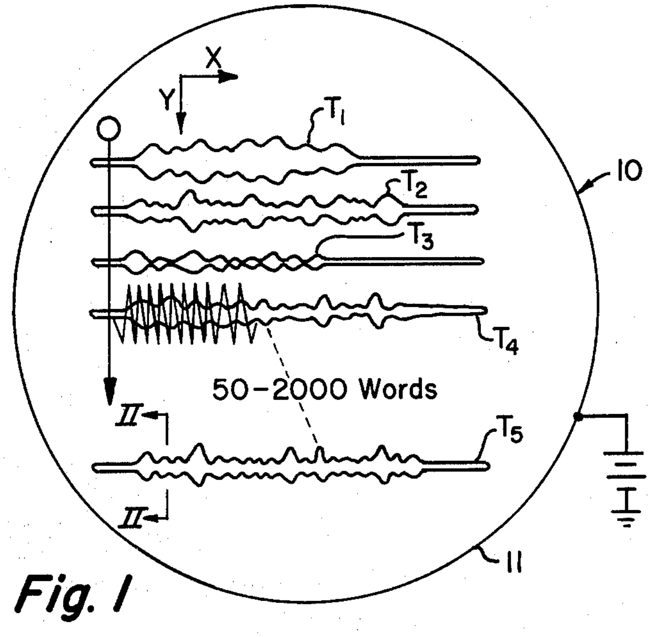
Fig. 1
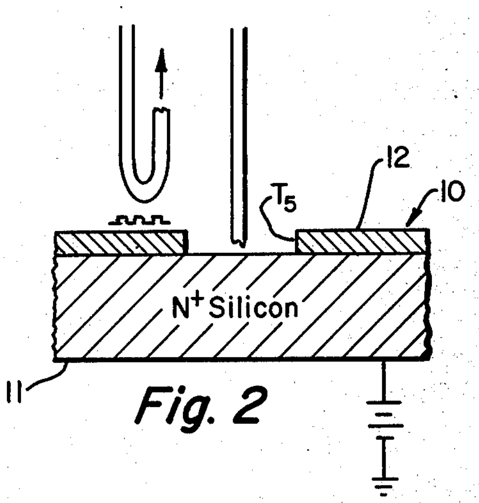
Fig. 2
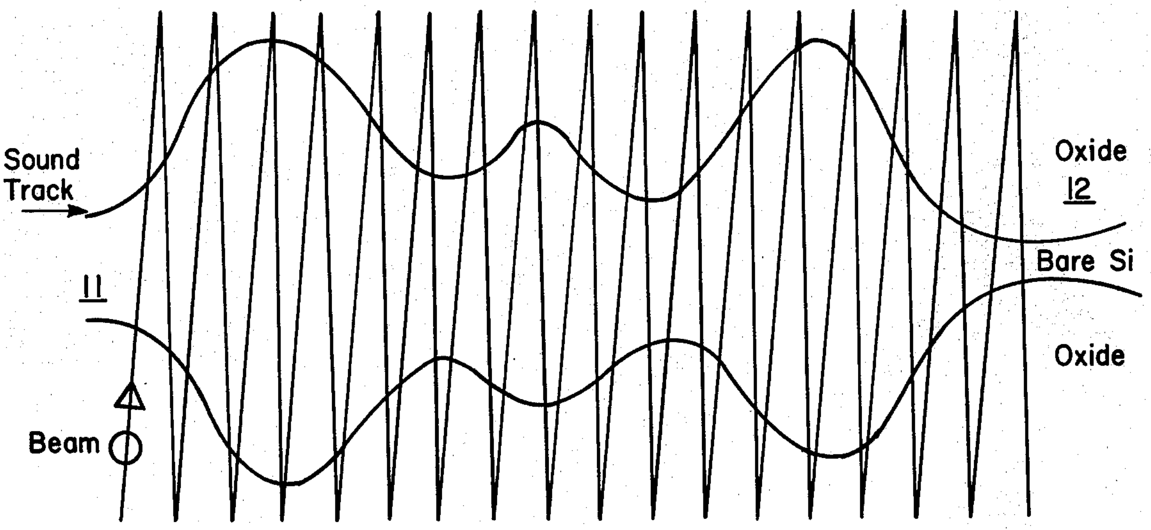
Fig. 3 Time →
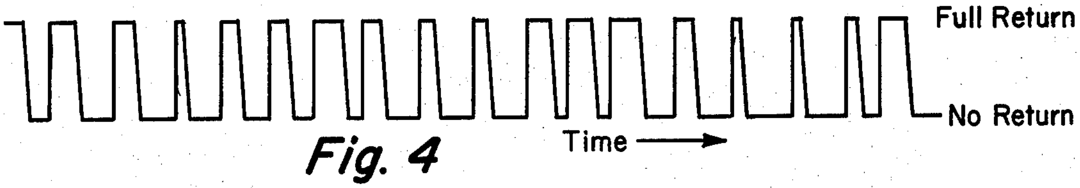
Fig. 4 Time →
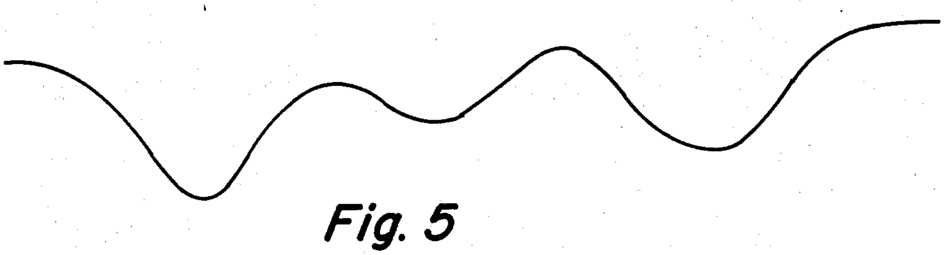
Fig. 5

RANDOM-ACCESS SPOKEN WORD ELECTRON BEAM DIGITALLY ADDRESSABLE MEMORY

BACKGROUND OF THE INVENTION

The present invention relates to a random access to a recording memory of spoken words through scanning of an electron beam controlled by a digitally addressible control which is particularly useful to construct sentences by assembling different length words one after another taken at random from the memory. The invention also applies to a recorded memory of identifiable audio sounds and electrical impulses.

The problem of man-machine interfacing is becoming acute with the increase utilization of digital computers. Many attempts in the past were directed to facilitate rapid communication exchange between man and computer which have been implemented by approaches such as light pen inputting, computer movies, high speed print out, teletype consoles, etc. In regard to the field of transportation, for example, using hardware such as airplanes, space vehicles and numerous other means of transportation, computer aided direction and control are necessary. There has been developed a variety of specific gauges to guide the pilot. Most of these indicators are visual and therefore tax the concentration of the pilot or human being in command or in charge of the control.

The audio channeling of information directly from a computer to a man's ears is presently, at best, rudimentary, typically confined to audio warning buzzes and/or very simple prerecorded messages. In contrast to this, sophisticated audio messages of the type "pressure dropping rapidly in rear rudder control system, suggest immediate lowering of base system hydraulic pressure to 16 psi; begin reflushing procedure 938, repeat 938" are presently unheard of forms of audio messages. Some of the underlying problems concerning the failure by the art to provide such sophisticated audio messages have resulted from factors such as random access to word memories are presently constrained by cost and size to encompass vocabularies of 50 to 100 words which is totally inadequate for composition of meaningful sentences that might cover the multiplicity of situations and occurrences, for example, during an airplane flight. Most current methods of random accessing spoken words using rotating discs or belts of magnetic material require multiple magnetic heads or some other type of mechanical system for rapid access. Such rapid access mechanical systems are expensive, bulky and generally require very critical adjustment. Systems of these types, except for the most costly and sophisticated, are based on a fixed word length access. In other words, the time between the beginning of successive words is selected to accommodate the longest word in the vocabulary. Thus, a rotating belt-type of magnetic recording system or disc-type would have a preselected speed such that the longest word of the vocabulary is written around one full rotation of the belt or disc. This has the marked disadvantage that when short and long words are included in the vocabulary it is necessary to wait for a complete revolution of the recorder for short words. As a result, there is produced unnatural breaks in the speech that lead to a loss in intelligibility. Most current systems ae restricted to one prime inflection per word which is generally produced by the system in a monotone. Thus, information conveyed normally in the inflection of words during normal conversation is entirely missing. The choice of multiple head tape or disc-type recorders with all their weight and mechanical complexity and generally high cost are considered to be an unacceptable medium due to the limited number of words in the vocabulary which they replay at a fixed recording interval without meaningful word inflections.

One of the primary problems that must be dealt with to construct a machine which will form sentences by butting together words pulled from a random memory may be understood when one considers that spoken words take between 0.25 to 2 seconds to enunciate. However, in most languages the time between the ending of the word and the beginning of the enunciation of the next word may be as short as 10 to 50 milliseconds. Thus, random access to a memory containing a word vocabulary should be completed within 10 to 50 milliseconds and then playback of the word during a one second time duration. This rapid access time followed by the slow rate for replay places requirements that exist no matter what form the system may take, whether magnetic discs, magnetic core memory, etc. in order that information storage capacity is not wasted during the slow rate for the audio signal replay.

Since practically all of the present systems require movement such as rotation of a disc or belt, it is extremely difficult and expensive in terms of the required hardware to obtain the desired position of the tape relative to the playback head in 10 milliseconds following which the recording equipment must almost instanteously revert to a much slower read speed to replay the word. It is apparent that to maintain a constant high access speed, such as a disc memory does in a digital computer, wastes memory capacity during the slow bit per second voice enunciation. This rapid change between information play and information search is a considerable detriment to any high mass mechanical system intended as a spoken word memory. Other alternative systems ae known to include putting a multiplicity of playback heads over a magnetic recording so that at least one head is near to the desired word on the recording at any instant. This is impractical and expensive except for a limited vocabulary of fixed word length memories. So called buffered digital to voice converters are known wherein a sentence can be assembled at a video rate and then played back from a buffer store at an audio rate. Such converters, while useful, are also expensive and require a high speed mechanical drum or disc for word storage plus assembly circuitry for the sentence.

SUMMARY OF THE INVENTION

The present invention provides a compact and inexpensive digitally accessible digital-to-voice memory with instant access to a 500–2000 word vocabulary including variable length words.

More specifically, according to the present invention, there is provided a method for addressing an electron beam to select and then scan one of a plurality of spaced-apart and elongated analog data storage tracks defined upon the surface of a target, the method including the steps of controlling the electron beam by an address number to sweep along the tracks on the target in a direction normal to the extended length of each data storage track, producing a track scan enabling signal upon sweeping of the electron beam along an addressed number to an addressed one of the analog data storage tracks, scanning the selected storage track by deflecting the electron beam along the elongated length of the selected storage track in response to the track scan enabling signal, causing the electron beam to oscillate at a dither frequency to produce a desired track scan width during the scanning of the length of the selected storage track, sensing the symmetry of the track scan to maintain centering of scan on the track, and producing a data signal corresponding to the analog data stored on the selected track during scanning thereof by the electron beam.

The present invention provides an apparatus for random access by an electron beam to analog data storage tracks, the apparatus comprising target means having a recording of a plurality of spaced-apart analog data storage tracks, means for producing an output electrical signal when the analog data storage tracks are scanned by an electron beam, first control means for directing the electron beam onto one of the analog data storage tracks, second control means for directing the electron beam along the selected one of the analog data storage tracks, and means for oscillating the electron beam at a dither frequency to scan the width of the selected one of the analog data storage tracks.

These features and advantages of the present invention as well as others will be more apparent when the following description is read in light of the accompanying drawings, of which:

FIG. 1 is a plan view of a wafer target illustrating a plurality of analog sound tracks thereon;

FIG. 2 is an enlarged sectional view taken along linesII—II of FIG. 1;

FIG. 3 is an enlarged view of an analog sound track illustrating the scanning thereof using an electron beam at a dither frequency;

FIG. 4 is a waveform illustrating the pulse width modulated signal produced during scanning of the analog sound track;

FIg. 5 is a demodulated audio signal produced from the waveform according to FIG. 4;

Figure 6:
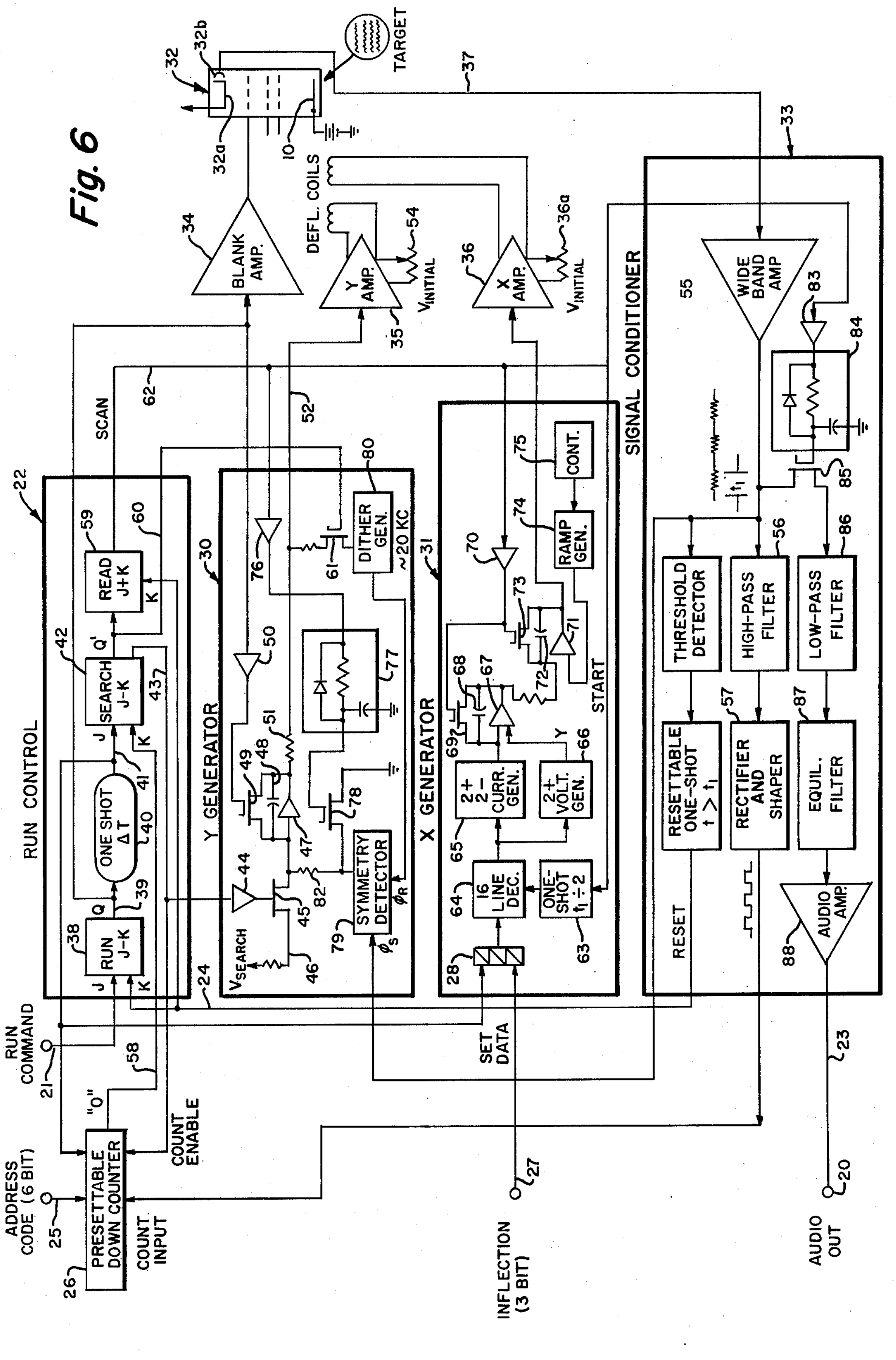
FIG. 6 is a block diagram of a digitally addressible control system for random access to the analog audio signals accordng to FIG. 1.

As illustrated in FIG. 1 of the drawings, a target wafer 10 has a plurality of spaced-apart elongated, separate, independent and permanent sound tracks T1, T2, T3, T4 and T5 etched into the surface of the target by photolithographic masking or other engraving techniques. Each track extends in an "X" direction as indicated in FIG. 1 and represents an analog recording of one word enunciated clearly such as by a professional announcer or the like. The word need not be spoken in English but instead may be spoken in French, Russian, etc. Alternatively, the tracks may be an analog recording of data signals, such signals as produced by a harpsichord, or a complete recording of phonemics.

It is preferred to fabricate the target from a silicon wafer substrate 11 in order to make use of its availability as an optically flat surface with a purity which guarantees the growth of defect-free oxide layer 12, but the semiconducting properties of silicon are not used. The tracks etched in the oxide surface of the wafer are variable widths in the "Y" direction and a track length of the order of the slice diameter. The tracks may be defined by photoreduction of actual sound track recordings either as a variable width or variable height. The oxide surface layer 12 of the silicon substrate should be 1000 to 5000 Angstrom units thick whereby up to 2000 tracks may be defined by the opposed edges of the opening etched into the oxide surface to expose the silicon material which is connected to ground as shown in FIG. 2.

Readout of the analog recording of sound tracks occurs by addressing a high resolution electron beam from the electron gun of a return beam vidicon tube over the appropriate track. The beam may have a diameter of the order of 0.0002 inch diameter. Deflection circuits for the beam combined with digital control, count down the tracks at a high rate in the "Y" direction indicated in FIG. 1 within 50 milliseconds. After selecting the addressed track, playback is accomplished by a horizontal "X" direction scan reverting to a low, approximately one inch per second, scan rate. The attractiveness of this readout technique is that the electron beam is of a very low mass. The beam can streak across the target at an arbitrarily high velocity only to instantly settle down at a selected track and scan at a speed of one inch per second. The resulting very fast track acquisition with an instantaneous change in beam velocity is necessary to effectively construct sentences without unnatural breaks. The present invention additionally provides that the horizontal scan rate is controlled in the manner that subtle changes in the replay frequency can be inexpensively programmed during the playback mode of a word to simulate different word inflections and/or enunciation rates as will be discussed hereinafter.

By providing a search amplifier with 20,000 hertz bandwidth, any word in a 1000 word vocabulary recorded on the target can be found within 50 milliseconds. As the beam scans the target in the "Y" direction, the audio amplifier is disabled and the scan output is coupled directly to a wave shaper and downcounter whereby the track count by the electron beam provides a digital count as an input to the downcounter. At "0" or match count, the horizontal scan control amplifier is enabled to deflect the beam to scan at a progammed rate as determined by, for example, a three bit inflection code. As the beam moves horizontally across the track, a servo feedback circuit maintains the electron beam centerd on the track to assure scanning the entire width and to prevent straying of the beam off of the acquired track. Scanning actually takes place in the horizontal direction as the beam undergoes a dither oscillation in the Y direction as shown by FIG. 3. At the end of the track, a threshold detector or other signalling detector means monitors the alternating current content of the output to indicate the end of the word whereupon the beam jumps to a reference position from where it starts a new scanning cycle. It is important to note that this end-of-the-word detector provides a variable length word readout which is necessary for natural speech.

The beam oscillates at a dither frequency of, for example, 20,000 hertz. As the beam penetrates to the substrate silicon material, the energy of the beam is diverted to the ground. When the beam is over the oxide surface, the silicon oxide becomes quickly charged up and a large percentage of the beam is returned to an electron multiplier in the return beam vidicon tube. The return beam signal forms, as indicated by FIG. 4, a pulse width modulated signal at the dither frequency. This signal is then demodulated to produce the audio output signal, such as having the conventional audio waveform illustrated in FIG. 5. The audio output signal appears at terminal 20 of the control system shown in FIG. 6. Input coding to the system can be in the form of, for example, $X_1$, $X_2$, $X_3$ $X_4$, $X_5$, $X_6$ $X_7$, $X_8$, $X_9$. In this input, the binary digits 5 to 12 call for the proper word and digits 2–4 call for word inflection. The binary digit $X_1$ can be used to choose between alternate languages, say French, English, when using an alternate vocabulary of French and English words. This will produce a word-for-word translation which, although less than a totally desirable form of translation, would be intelligible since at least the sentence will be spoken in perfect French pronunciation. The binary digit $X_1$ can also be used as an end of sentence identifier and thereby introduce a timed pulse.

Referring now to FIG. 6, at the desired start time a run command input pulse is applied to terminal 21 and applied to a J-K flip-flop which begins the run cycle and activates the run control 22. The run control sequences the instrument through a search mode to acquire the desired track which is then followed by a read mode to provide an audio output at an audio terminal 20 and then finally to return to a standby operation with the reset pulse K in line 24. Selection of the desired word to be scanned from the targets is accomplished by a 6-bit digital address code supplied as an input to line 25 of a preset downcounter 26. The address code further includes a 3-bit inflection code applied to a line 27 of a 3-bit register 28. The address and inflection codes present at lines 25 and 27 govern the memory operation for that cycle. In addition to the run control 22, the instrument further includes a "Y" direction control signal generator 30 and "X" direction control signal generator 31 which produce control signals for a return beam vidicon tube 32 producing an output signal delivered to a signal conditioner 33.

The electron beam from a gun 32*a* in the tube 32 is controlled by a blanking "Z" direction amplifier 34, by a "Y" direction amplifier 35 and an "X" direction amplifier 36, for the scanning of the target 10. The portion of the beam returned from the target is collected at a terminal 32*b* to produce an output signal in line 37 to the signal conditioner 33. After the run command signal is produced, the run J-K flip-flop 38 produces on its X output a voltage step in line 39 which activates the Z amplifier 34 to blank an output signal from the vidicon tube 32. At the same time, the Q-voltage step is applied to a one-shot monostable multivibrator which generates a pulse of T duration in line 41. The pulse in line 41 is used as a set pulse for the preset downcounter and to a search J-K flip-flop 42 which produces on its Q′ output a search enabling signal in line 43 applied to the preset downcounter 26 and to a drive amplifier 44 in the Y generator. This amplifier renders conductive an insulted gate transistor 45 thereby applying a search reference voltage in line 46 to an integrating amplifier 47 having a feedback path including a capacitor 48 and in series thereby an insulated gate transistor 49 rendered nonconductive during the search mode by a signal from amplifier 50 for the blanking signal applied to the Z amplifier 34. The integrating amplifier 47 produces an output signal which, after passing through a resistor 51, is applied by line 52 to the Y amplifier 35. This amplifier has an initial beam set point provided by a potentiometer 54. The output of the amplifier 35 is connected to a deflection coil for directing the electron beam within the vidicon tube 32 to scan the target 10 in the "Y" direction indicated by the arrow in FIG. 1. As this scanning proceeds along one end of the tracks, an output signal is provided in line 37 which is connected to a wide band amplifier 55 then a high pass filter 56 followed by a rectifier and wave shaper so that the resultant signal is in a form of pulses which forms a count input to the preset counter 26. As indicated previously, due to the low mass electron beam, it is possible to sweep the beam along the tracks in the "Y" direction at arbitarily high velocities. As it scans across tracks, there is provided a count input to the downcounter 26 until a count of zero is reached, whereupon track acquisition signal K is delivered along line 58 to trigger the search flip-flop 42 thereby producing a trigger signal for the read flip-flop 59, When this occurs, a vertical dither enabling signal is sent along line 60 to an insulated gate transistor 61. At the same time, the read flip-flop 59 produces a scan enabling signal in line 62.

Figure 8:
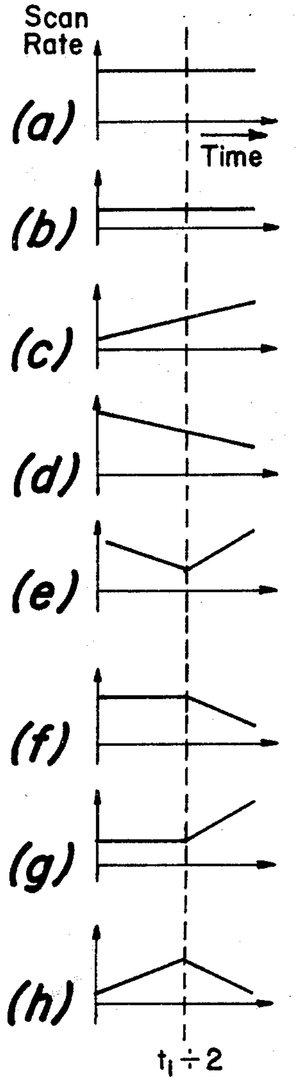
FIGS. 8A–8H are waveforms illustrating typical word inflection rates during scanning of the target.

The signals in lines 60 and 62 are used to control the electron beam in the "X" direction as it scans the acquired track. The enabling signal in line 62 is applied to a one shot multivibrator 63 having a time constant t1 corresponding to an X track scan time of, for example, one second divided by two. The output from the multivibrator 63 controls one bit of the 4-bit to 16-line decoder 64 for the signal from the 3-bit inflection code register 28. The signal from the decoder 64 provides in addition to a command for scanning in the "X" direction, a desird word inflection brought about by the digital inflection code to produce a programmed scan rate in the "X" direction. Typical examples of this programmed scan rate are shown in FIGS. 8A–8H, wherein the graph of FIG. 8A represents a high constant scan rate, FIG. 8B a lower constant scan rate. FIG. 8C represents an accelerating scan rate while FIG. 8D represents a decelerating scan rate. FIG. 8E represents a decelerating scan rate until time $t/2$ which is then followed by an accelerating scan rate. FIG. 8F represents a high initial scan rate until time $t/2$ whereupon a decelerating scan rate is accomplished. FIG. 8G represents a low constant scan rate until time $t/2$ whereupon an accelerating scan rate occurs. FIG. 8H represents an accelerating scan rate until time $t/2$ whereupon a decelerating scan rate occurs at the remaining portion of the scan. These are but a few examples of the manner in which the target can be scanned at variable rates to provide word inflections based on an input inflection code.

Figure 9:
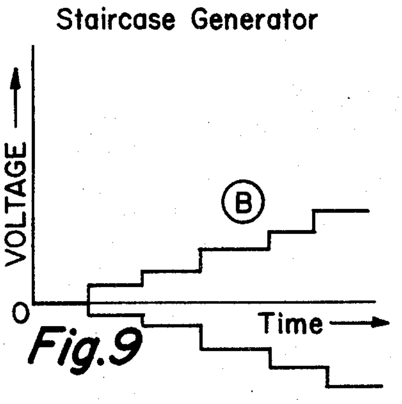
FIGS. 9–12 are waveforms illustrating word extension or compression according to the present invention.
Figure 10:
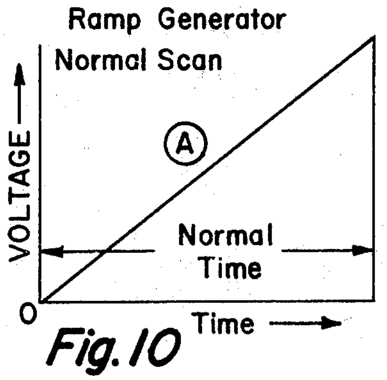
Figure 11:
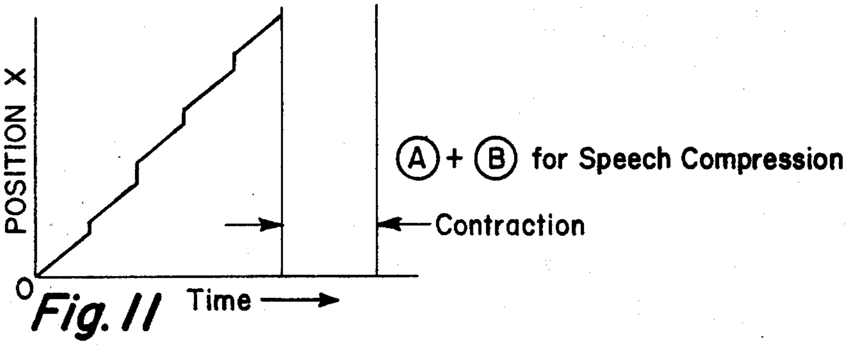
Figure 12:
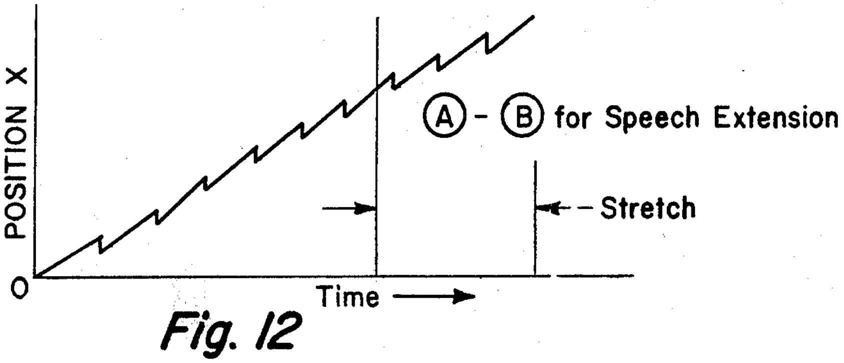

Again referring to FIG. 6, the signal from the decoder 64 is applied to a current generator 65 and voltage generator 66. The generators 65 and 66 based on the input signal from the decoder deliver signals to an integrating amplifier 67 used for controlling the X scan rate and includes a feedback path having a capacitor 68 and in parallel therewith an insulated gate transistor 69 which is rendered nonconductive by the enabling signal in line 62 after delivering from an amplifier 70. The output from the X scan rate generator 67 is applied through a resistor as an input to an overall X scan control integrating amplifier 71 having a feedback path including a capacitor 72 and in parallel therewith an insulated gate transistor 73 controlled in response to the enabling signal from amplifier 70. The output signal from the amplifier 71 is delivered to the X amplifier 36 which includes a potentiometer 36*a* to provide a beam set point in the initial "X" direction prior to actual scanning of the track. The amplifier 71 also receives an input signal from a ramp generator 74 having a control 75. The control 75 which may be instructed from the digital input, is used to turn the ramp generator ON and OFF as well as provide a reverse polarity output signal such as shown by the waveform for the staircase generator in FIG. 9. In this figure a positive voltage +B increases in time in a step-like manner, and a negative voltage −B decreases in time with the displacement of the beam in the "X" direction. FIG. 10 illustrates a base or conventional scan A wherein the graph line represents the X beam position with respect to time. This would correspond to the ramp generator being turned OFF by the control 75. When the ramp generator is turned ON word compression occurs by applying the B+ signal to the amplifier 71 for addition with the normal scan rate represented by FIG. 10. This produces a scan rate given by the graph line shown in FIG. 11 whereby scanning of the target is accomplished at a time producing a contraction over the normal time represented in FIG. 10. A stretching of the normal scan time occurs by applying a negative staircase signal to the amplifier 71 which is represented by the graph line shown in FIG. 12. Thus, it will be observed that an increased time is required in order to displace the beam in the X position the required distance for scanning the analog signal on the target 10.

With reference again to FIG. 6, the enabling signal in line 62 is also applied to an amplifier 76 whose output is applied to a delay element 77 which is in turn connected to an insulated gate transistor 78 to remove the ground bias applied to the output of a symmetry detector 79. A dither reference signal input to the symmetry detector is delivered from a dither generator 80 which produces a dither frequency at, for example, 20,000 hertz. The dither generator produces its normal dither frequency signal to line 52 after passing through the insulated gate transistor 61 when rendered conductive in response to the signal in line 60. This dither frequency signal is applied to the Y control signal delivered to the Y amplifier 35. As scanning of the acquired track occurs in the "X" direction, a servo control loop is used to develop a position error signal by a symmetry detection of the dither modulated target output signal. This is accomplished by applying the output signal from the wide band amplifier 55 as an input signal to the symmetry detector 79 which produces a symmetry error signal through resistor 82 to integrating amplifier 47 and thereby provide a bias for a servo control to the Y signal delivered to the Y amplifier 35.

Figure 7:
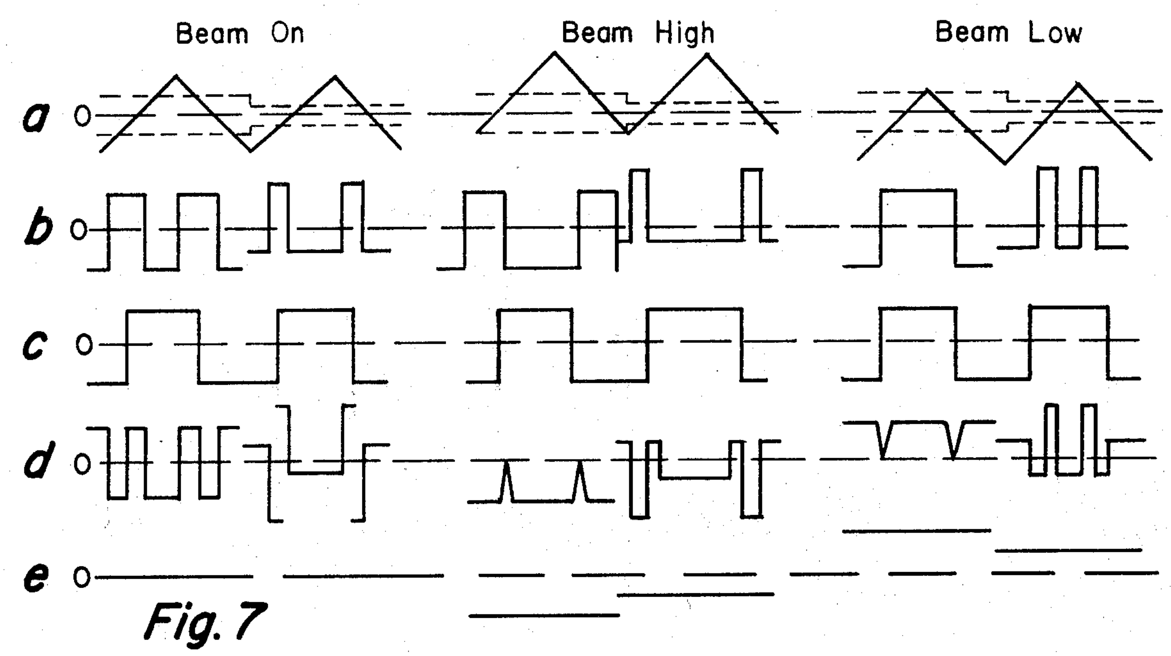
FIGS. 7A–7E are waveforms illustrating the tracking of the electron beam during scanning of the target.

The operation of the Y servo control may be further understood by referring to FIGS. 7A–7E where according to FIG. 7A the signals developed are shown for the beam center position, the beam high position and the beam low position, when scanning wide or narrow portions of track. FIG. 7B illustrates the signal from the target during each of the three conditions shown by FIG. 7A. This signal would correspond to the signal applied to the symmetry detector 79 from the wide band amplifier 55. The reference phase signal applied to the detector 79 has the waveform illustrated by FIG. 7C. The output signal from the target and its complement are alternatively applied to the detector output in synchronism with the plus and minus phase of the reference phase signal from the dither generator 80. This results in a detector output signal passing through resistor 82 shown in its unfiltered form by the waveform of FIG. 7D and a filtered error signal shown by the waveform of FIG. 7E. In FIG. 7E when the beam is on position, there is no error signal. However, when the beam is scanning high on the track which may be either a wide or narrow track width as shown by FIG. 7A, the error signal occurs as a negative correction factor as shown by the waveform of FIG. 7E. In a corresponding manner, when the beam is scanning low on the target a positive correction voltage occurs.

The enabling signal in line 62 is also applied to an amplifier 83 within the signal conditioner 33. The signal from the amplifier 83 after passing through a delay element 84 renders an insulated gate transistor 85 conductive thereby applying the output signal from the wide band amplifier 55 to a low pass filter 86 to remove the high frequency component from the signal in line 37 from the vidicon tube 32. The output from the low pass filter 86 is connected to an equalization filter 87 which in turn delivers an output signal to an audio amplifier 88 that produces an audio output signal in line 23 having the waveform according to FIG. 5 as previously described.

Both the X and Y generators are followed by deflection control amplifiers for the deflection coils used for magnetic deflection of the electron beam in the vidicon tube. However, deflection plates of an analog memory tube may be similarly controlled according to the teachings of this invention. The X and Y position controls are accompanied with a "Z" direction beam control by amplifier 34. This amplifier can be used to provide a beam blanking during standby mode. It can also be controlled to provide intensity modulation during the run cycle to improve track acquisition performance as well as allow volume emphasis during the reading mode. Such emphasis could be under external control if desired or it could be selectively programmed in the same manner as the inflection control described herein above.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. An apparatus for random access by an electron beam to analog data storage tracks, said apparatus comprising:

target means having a recording of a plurality of spaced-apart storage tracks defining essentially permanent recordings of analog data;

means developing an electron beam to scan along a storage track defined by said target means for producing an output electrical signal corresponding to the recordings of analog data;

first control means to direct said electron beam onto only a selected one of said storage tracks defined by the target means;

second control means to direct said electron beam along only the selected one of said storage tracks defined by the target means;

means for oscillating said electron beam at a dither frequency having an amplitude corresponding essentially to the width of the selected one of said analog data storage tracks; and a digitally addressible control means coupled to said means for oscillating and said first and second control means to select and then scan along a storage track for producing an electrical signal corresponding to the recording of analog data, said digitally addressible control means enabling said first control means to direct said electron beam from track-to-track onto the selected one of said storage tracks, said digitally addressible control means further enabling said means for oscillating and said second control means to direct said electron beam along the storage track while the beam oscillates at the dither frequency and thereby scan the selected one of said storage tracks.

2. The apparatus according to claim 1 further comprising filter means for receiving a signal delivered from said means for producing, signal conditioning means responsive to the signal from the said filter means for nonconductive coating on said substrate having defined therein said variable width tracks such that the absence of said coating, forms said tracks and exposes said substrate to said electron beam.

3. The apparatus according to claim 1 wherein said analog data storage tracks each further include a threshold recording of a signal to represent the end of each analog storage track, said apparatus further comprising threshold detector means responsive to the electrical signal delivered by said means for producing, to reset said digitally addressible control signal means.

4. The apparatus according to claim 3 further comprising register means for receiving electrical signals corresponding to different scan rate inflection patterns for said electron beam and decoder means receiving the electrical signals corresponding to different scan rate inflection patterns for biasing the control by said second control means.

5. The apparatus according to claim 1 wherein said plurality of spaced-apart analog data storage tracks each comprise a variable width track lying below the surface of said target means and exposed to said electron beam.

6. The apparatus according to claim 5 wherein said target means are further defined to include an electrically conductive substrate, and an essentially nonconductive coating on said substrate having defined therein said variable width tracks such that the absence of said coating, forms said tracks and exposes said substrate to said electron beam.

7. The apparatus according to claim 5 wherein said target means are further defined to include a flat silicon wafer substrate, and an oxidized film on said substrate for defining said variable width tracks such that the absence of said oxidized coating, forms said tracks and exposes said substrate to scanning by said electron beam.

8. The apparatus according to claim 5 further comprising detector means for comparing the dither frequency from said means for oscillating with the electrical signal from said means for producing, to thereby provide a track scanning error signal for use by said first control means.

9. The apparatus according to claim 5 wherein said means for producing an electrical signal are further defined to include a return beam vidicon tube including means for producing an electron beam, and means for deflecting said electron beam in response to said first and second control means.

10. The apparatus according to claim 9 further comprising third control means in the signal path of said electron beam for controlling intensity of said electron beam to scan said storage tracks on said target means.

11. The apparatus according to claim 5 wherein said spaced-apart analog data storage tracks each representing an analog record of an audio signal, said apparatus further comprising filter means receiving the electrical signal from said means for producing, and means for amplifying the signal from said means for filtering.

12. The apparatus according to claim 11 further comprising blanking means controlled by said digitally addressible control signal means for disabling delivery of the output electrical signal corresponding to the recordings of analog data to said means for amplifying during the time until the electron beam is directed onto a selected one of said storage tracks.

13. A method for addressing an electron beam to select and then scan one of a plurality of spaced-apart and elongated analog data storage tracks defined upon the surface of a target, said method including the steps of:

acquiring a predetermined and desired one of said plurality of spaced-apart and elongated analog data storage tracks by deflecting said electron beam to sweep along said target from track-to-track in a direction normal to the extended length of each data storage track;

producing a track scan enabling signal upon sweeping of the electron beam along said target onto the desired one of said analog data storage tracks;

scanning only the selected storage track by deflecting said electron beam along the elongated length of the selected storage track in response to said track scan enabling signal;

causing said electron beam to oscillate at a dither frequency to produce a desired track scan width during the scanning of the length of only the selected one of said analog data tracks; and producing a data signal corresponding to the analog data stored on the selected track during scanning thereof by the electron beam.

14. The method according to claim 13 wherein said acquiring a preselected and desired storage track includes deflecting said electron beam from track-to-track according to an address number defined by a digital address code.

15. The method according to claim 13 wherein said producing a data signal includes demodulating at said dither frequency the signal produced during said scanning of the selected storage track.

16. The method according to claim 13 wherein said data storage tracks include analog recordings of an audio signal.

17. The method according to claim 16 including the further step of controlling the rate of said scanning of the selected storage track according to a preselected inflection for said data signal.

18. The method according to claim 16 including the further steps of:

detecting a track scanning error by comparing a signal corresponding to said dither frequency with a signal corresponding to said data signal, and modifying the scanning direction along the length of the selected storage track according to a signal corresponding to said track scanning error.

19. The method according to claim 16 including the further step of blanking a data output signal corresponding to said data storage signal during the time when said electron beam sweeps along the tracks on said target to an addressed one of said tracks.

20. The method according to claim 16 including the further step of controlling the duration of time for completing said scanning the selected storage target according to a preselected data track scan time.

21. The method according to claim 16 including the further steps of:

providing a threshold signal at the end of the analog recording of data on said storage tracks, detecting said threshold signal from said data signal during scanning of the selected track, and controlling said electron beam to deflect to a predetermined position.

22. The method according to claim 16 wherein said electron beam is controlled in a manner to produce a scan enabling signal within 50 milliseconds during said sweep along the tracks on said target.

* * * * *